Oct. 27, 1942.   I. K. DORTORT   2,300,377
ELECTRIC VALVE CONVERTING SYSTEM
Filed Feb. 24, 1941
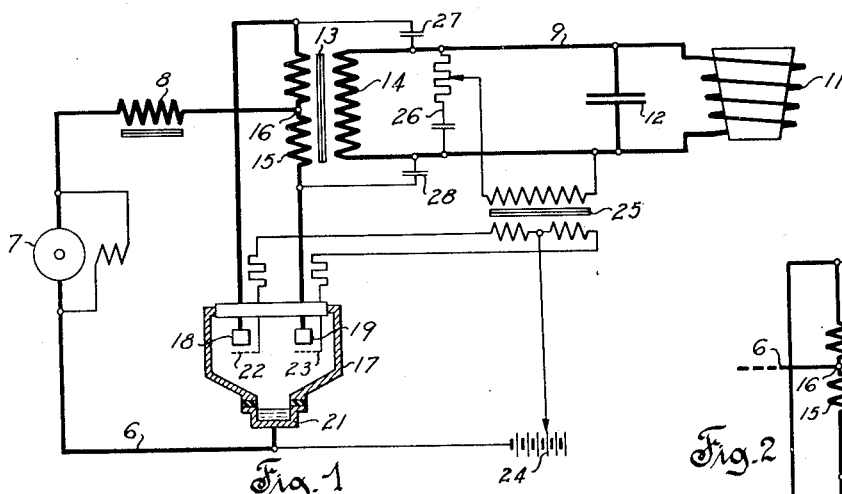
Fig. 1
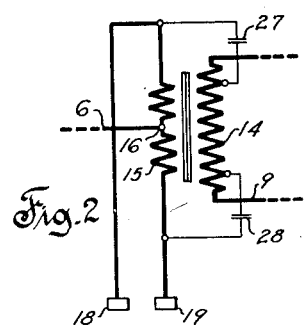
Fig. 2
Fig. 3
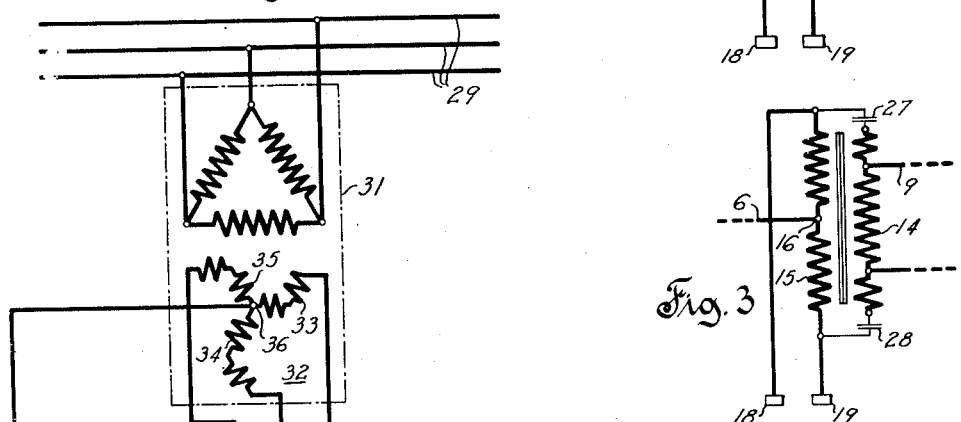
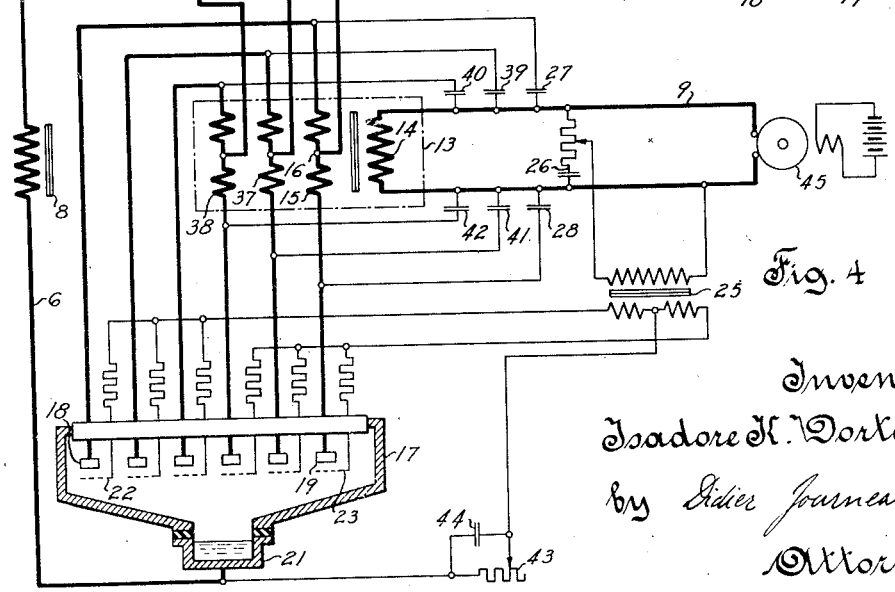
Fig. 4
Inventor
Isadore K. Dortort
by Didier Journeaux
Attorney Patented Oct. 27, 1942

2,300,377

UNITED STATES PATENT OFFICE 2,300,377

ELECTRIC VALVE CONVERTING SYSTEM

Isadore K. Dortort, West Allis, Wis., assignor to Allis-Chalmers Manufacturing Company, Milwaukee, Wis., a corporation of Delaware Application February 24, 1941, Serial No. 380,216

10 Claims. (Cl. 175—363)

This invention relates in general to improvements in electric valve converting systems and more particularly to systems for converting direct current or alternating current of relatively low frequency into alternating current of relatively high frequency.

In systems employing discontinuously controllable electric valves for converting a given electric current into alternating current having a frequency of the order of one thousand cycles per second, the periodic transfer of the flow of current between the different valves is generally effected by discharge of capacitors conductively connected between the valve circuits. The capacitors are continuously energized at the voltage impressed between the anodes of the valves and must therefore be designed to withstand relatively high voltages and to carry relatively large capacitive currents. For these reasons the cost of the capacitors is relatively high, and their capacity is generally reduced to a minimum amount. The system, however, then becomes sensitive to minor variations in the voltages of the supply circuit.

It is therefore preferable to obtain the transfer of current between valves by the charge of capacitors coupling the primary and secondary windings of the output transformer of the system. Such coupling capacitors may be so connected as to be without voltage or as to receive a relatively low voltage during the greater portion of the cycle of operation of the system. Under these conditions the capacitors may be of comparatively low cost, and they may be given ample dimensions without excessively increasing the cost of the system.

It is therefore one object of the present invention to provide an electric valve converting system in which current is transferred from one valve to another by the charge of a capacitor.

Another object of the present invention is to provide an electric valve converting system in which current is transferred from one valve to another by means of a capacitor which is substantially without charge during the greater portion of the operating cycle of the system.

Objects and advantages other than those above set forth will be apparent from the following description when read in connection with the accompanying drawing, in which:

Fig. 1 diagrammatically illustrates one embodiment of the present invention for converting direct current into high frequency alternating current comprising capacitors connected between the primary and secondary terminals of the output transformer of the system;

Fig. 2 diagrammatically illustrates a modified connection of the coupling capacitors between the primary winding and an equal number of turns of the secondary winding of the transformer;

Fig. 3 diagrammatically illustrates another modified connection of the coupling capacitors between the primary winding and auxiliary winding portions of the transformer bringing the number of secondary turns to equal that of the primary turns; and Fig. 4 diagrammatically illustrates another embodiment of the present invention for converting low frequency alternating current into high frequency alternating current.

Referring more particularly to the drawing by characters of reference, reference numeral 6 designates a supply circuit of inductive character energized from a suitable source of direct current such as a generator 7. The inductance of circuit 6 may reside principally in the conductors thereof and in source 7 or may be provided by insertion therein of a reactor 8. Energy is to be transmitted from circuit 6 to an alternating current load circuit 9 to be operated at high frequency and comprising a suitable current consuming device such as an induction furnace 11. A capacitor 12 is connected in parallel with the coil of furnace 11. The capacitance of capacitor 12 is chosen sufficiently large to overbalance the inductance of furnace 11, to thereby impart to the load circuit a capacitive character. The two circuits are connected through a translating system comprising an output transformer 13 provided with a secondary winding 14 connected with circuit 9 and a primary winding 15 provided with midtap 16. Windings 14 and 15 will be assumed to have the same number of turns so that the terminal voltages of the two windings will be equal.

Circuit 6 is connected with the midtap 16 and is further connected with the terminals of winding 15 through a pair of electric valves 17 of the discontinuously controllable type. The valves are provided with anodes 18, 19 and the cathodes of the valves are preferably combined into a common cathode structure 21 connected with circuit 6. The conductivity of the valves is controlled by means of suitable control electrodes which may be control grids 22, 23 if cathode 21 is continuously maintained emissive. A source of direct current, such as a battery 24 connected with cathode 21 and with grids 22, 23, serves to render the valves non-conductive. The valves may be rendered alternately conductive by means of a transformer 25 connecting grids 22, 23 with battery 24. Transformer 25 is energized from circuit 9 through a suitable phase adjusting voltage divider 26. The transfer of the flow of current between the valves is effected by means of a pair of capacitors 27, 28 capacitively coupling winding 15 to winding 14. The capacitors also connect winding 15 capacitively across circuit 9.

The system follows a cycle of operation during which current flows every instant through anode 18 or through anode 19. Assuming that at a particular instant grid 23 has rendered anode 19 conductive, current flows from generator 7 through reactor 8, midtap 16, the lower half of winding 15, anode 19 and cathode 21 back to the generator. The magnetizing component of such flow of current magnetizes the core of transformer 13, thereby inducing equal voltages in winding 14 and in the entire winding 15. Capacitors 27 and 28 are thereby maintained completely discharged. The load component of the current through the lower half of winding 15 induces in winding 14 a current having one-half of its magnitude. The latter current is a leading current having an in-phase component supplying the energy dissipated in furnace 11 and a reactive component supplying the difference between the current of capacitor 12 and the reactive component of the current of furnace 11.

After the flow of current has taken place through anode 19 for a predetermined length of time, the voltage impressed on grid 23 from circuit 9 through voltage divider 26 and transformer 25 decreases to an extent such that battery 24 is able to render grid 23 negative with respect to cathode 21. Current, however, continues to flow through anode 19 as the grid is then only able to prevent the initiation of the flow of current after its interruption by other means. At a later moment of the cycle, grid 22 is rendered positive with respect to the potential of cathode 21, thereby rendering anode 18 conductive. Anode 18 is then at a potential higher than the potential of anode 19 the full voltage of winding 15. Anode 18 accordingly begins to carry current. At first the reactance of reactor 8 and the leakage reactances of windings 14 and 15 tend to prevent any change in the currents previously established therethrough. When anode 18 becomes conductive, accordingly, the flow of current continues in the manner above set forth from source 7 through reactor 8 and the lower half of winding 15, but instead of continuing through anode 19 the flow of current passes through capacitor 28, capacitor 12, capacitor 27, anode 18 and cathode 21 back to generator 7. The flow of current through anode 19 having ceased, grid 23 regains control and prevents the reestablishment of the flow of current through the anode.

Continued flow of current through capacitors 27, 28 causes the capacitors to be charged gradually. The flow of current continues at a decreasing rate and stops when the magnetic energy stored in the leakage fluxes of windings 14 and 15 has been completely converted into electrostatic energy stored in capacitors 27, 28 and 12. The capacitors thereupon discharge through windings 14 and 15, reversing the direction of the flow of current therethrough. The energy stored in the capacitors by interruption of the flow of current is substantially that necessary for overcoming the leakage reactances of the windings and to reestablish the flow of current therethrough in reverse direction at a value corresponding to the flow of current flowing through anode 19. Upon full discharge of the capacitors 27, 28 the flow of current through winding 15 is again produced solely by generator 7 and current flows from the generator through reactor 8, the upper half of winding 15, anode 18 and cathode 21 back to the generator. A corresponding current is induced thereby in winding 14 to supply capacitor 12 and furnace 11.

The flow of current through anode 18 continues for the same length of time as that of anode 19 and the current is thereafter again transferred to anode 19 by a process converse of that above described. The transfer of current between the anodes is repeated continually under the control of grids 22, 23 to cause circuit 9 to receive a continuous flow of alternating current. The frequency of the flow of current may be adjusted by varying the voltages impressed on grids 22, 23 from battery 24. The reversal of the flow of current through windings 14 and 15 twice per cycle is substantially instantaneous and the current waves supplied to circuit 9 have a rectangular wave form.

In the above description it was assumed that windings 14 and 15 had the same number of turns, but the windings may also be provided with different numbers of turns. Capacitors 27, 28 may then still be connected between the winding terminals, but they must then be able to carry continuously the current produced therein by the difference between the voltages of windings 14 and 15.

When winding 14 is designed for a higher voltage than winding 15, the capacitors 27, 28 may also be connected between the terminals of winding 15 and points of winding 14 comprising a number of turns equal to that of winding 15 as shown in Fig. 2. The action of the capacitors to transfer the flow of current between anodes 18 and 19 remains substantially as above described. Outside of such periods of current transfer, the capacitors are without current as when they are connected between the terminals of windings having equal numbers of turns. When winding 15 is designed for a higher voltage than winding 14, a connection converse of that of Fig. 2 may be utilized or else the capacitors may be connected between the terminals of winding 15 and extensions of winding 14, bringing the number of turns of winding 14 to that of winding 15, as shown in Fig. 3.

In the embodiment illustrated in Fig. 4 the current source is a polyphase alternating current circuit 29 energized from any suitable generator (not shown) and circuit 6 is retained as an intermediate circuit of the system. Circuit 29 is connected with circuit 6 through a transformer 31 comprising a secondary winding 32 divided into a plurality of phase portions 33, 34, 35 defining a neutral point 36 to which circuit 6 is connected. Transformer 13 is provided with windings 14 and 15 and with additional primary windings 37, 38 similar to winding 15. The neutral points of windings 15, 37 and 38 are severally connected with the phase terminals of winding 32. The terminals of windings 37, 38 are connected with the conductors of circuit 9 through capacitors 39, 40, 41, 42 similar to capacitors 27 and 28 and are connected with the anodes of a corresponding number of additional valves 17. The negative unidirectional voltage for controlling the grids of the valves may be produced by the voltage drop in a resistor 43 bridged by a capacitor 44, connected between cathode 21 and the secondary midtap of transformer 25. Circuit 9 may supply any load device of capacitive character such as an overexcited synchronous motor 45.

The operation of the present embodiment differs from that of the embodiment illustrated in Fig. 1 substantially only in that the different phase portions of winding 32 serve sequentially for the supply of energy to transformer 13 during each cycle of the voltage of circuit 29. Assuming that at a particular instant the terminal voltage of phase portion 33 is positive and greater than those of portions 34 and 35, portion 33 will supply current to winding 15 in the same manner as generator 7 in the embodiment illustrated in Fig. 1. Winding portions 34 and 35 are then without current because of the valve action of valves 17 connected therewith, and winding portion 33 operates as a single phase current source. This operation continues for one-third of a cycle of the voltage of circuit 29. During the following one-third of a cycle, winding portion 34 supplies current to winding 37, and during the next third of a cycle winding 35 supplies current to winding 38. Windings 15, 37 and 38 being similar and being similarly connected, energy is transmitted to circuit 9 through winding 14 as if such transmission were continuously effected through winding 15. Although the voltages impressed on windings 15, 37 and 38 from winding portions 33, 34 and 35 are sinusoidal, the flow of current through the system is maintained substantially uniform by the action of reactor 8.

Although but a few embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. In combination, an inductive electric current circuit, an alternating current consuming device of capacitive character, a transformer comprising a primary winding provided with a midtap and a secondary winding connected with said current consuming device, a pair of electric valves connecting said circuit between the terminals and the midtap of said primary winding, means for rendering said valves alternately conductive, and means for causing transfer of the flow of current between said valves comprising capacitor means connecting said primary winding across said current consuming device.

2. In combination, an inductive electric current circuit, an alternating current consuming device of capacitive character, a transformer comprising a primary winding provided with a midtap and a secondary winding connected with said current consuming device, a pair of electric valves connecting said circuit between the terminals and the midtap of said primary winding, means for rendering said valves alternately conductive, and means for causing transfer of the flow of current between said valves comprising capacitor means connecting all the turns of said primary winding across an equal number of turns of said secondary winding, said capacitor means being of such capacitance as to carry substantially the entire current of said primary winding during the time required by the outgoing one of said valves to become non-conductive.

3. In combination, a source of direct current, a capacitive alternating current consuming device, a transformer comprising a primary winding provided with a midtap and a secondary winding connected with said current consuming device, means comprising a reactor and a pair of electric valves connecting said source between the terminals and the midtap of said primary winding, means for rendering said valves alternately conductive, and means for causing transfer of the flow of current between said valves comprising capacitor means connecting said primary winding across said current consuming device.

4. In combination, a source of single phase alternating current, a capacitive alternating current consuming device, a transformer comprising a primary winding provided with a midtap and a secondary winding connected with said current consuming device, means comprising a reactor and a pair of electric valves connecting said source between the terminals and the midtap of said primary winding, means for rendering said valves alternately conductive, and means for causing transfer of the flow of current between said valves comprising capacitor means connecting said primary winding across said current consuming device.

5. In combination, a source of polyphase alternating current, a capacitive alternating current consuming device, a transformer comprising a plurality of primary windings each provided with a midtap and a secondary winding connected with said current consuming device, means comprising a common reactor and a plurality of pairs of electric valves severally connecting the phases of said source with the different said primary windings, means for rendering the valves of each of the different said pairs alternately conductive, and means for causing transfer of the flow of current between the valves of said pairs comprising capacitor means connecting said primary winding across said current consuming device.

6. In combination, an electric current supply circuit, an alternating current load circuit, a transformer comprising primary winding means and a second winding conductively connected with said load circuit, a plurality of groups of electric valves connecting said primary winding means with said supply circuit, means for rendering said groups of valves alternately conductive, and means for causing transfer of the flow of current between said valve groups comprising capacitor means connecting said primary winding means across said load circuit, said capacitor means being of such capacitance as to carry substantially the entire current of said primary winding means during the time required by the outgoing one of said valve groups to become non-conductive.

7. In combination, an inductive electric current supply circuit, a current consuming device of capacitive character, a transformer comprising primary winding means and a secondary winding conductively connected with said current consuming device, a plurality of groups of electric valves connecting said primary winding means with said supply circuit, means for rendering said valve groups alternately conductive, and means for causing transfer of the flow of current between said valve groups comprising capacitor means connecting said primary winding means across said current consuming device.

8. A system for transmitting energy from an electric current supply circuit to an alternating current load circuit comprising a transformer having a primary winding and having a secondary winding connected with said load circuit, a plurality of electric valves connecting said primary winding with said supply circuit, means for rendering said valves conductive in sequence, and means for causing transfer of the flow of current between said valves comprising capacitor means connecting said primary winding across said load circuit.

9. A system for transmitting energy from an electric current supply circuit to an alternating current load circuit comprising a transformer having a primary winding and having a secondary winding connected with said load circuit, a plurality of electric valves connecting said primary winding with said supply circuit, means for rendering said valves conductive in sequence, and means for causing transfer of the flow of current between said valves comprising capacitor means connected with said valves and forming a path for conducting a charging current upon passage of one of said valves into conductive condition during flow of current through another one of said valves to interrupt said flow of current.

10. A system for transmitting energy from an electric current supply circuit to an alternating current load circuit comprising a transformer having a primary winding and having a secondary winding connected with said load circuit, a plurality of electric valves connecting said primary winding with said supply circuit, means for rendering said valves conductive in sequence, and means for causing transfer of the flow of current between said valves comprising capacitor means connecting electrodes of said valves with points of equal potential of said load circuit, said capacitor means being in discharged condition during flow of current through one of said valves and forming a path for conducting a charging current upon passage of another one of said valves into conductive condition to interrupt the said flow of current.

ISADORE K. DORTORT.